Figure 4:
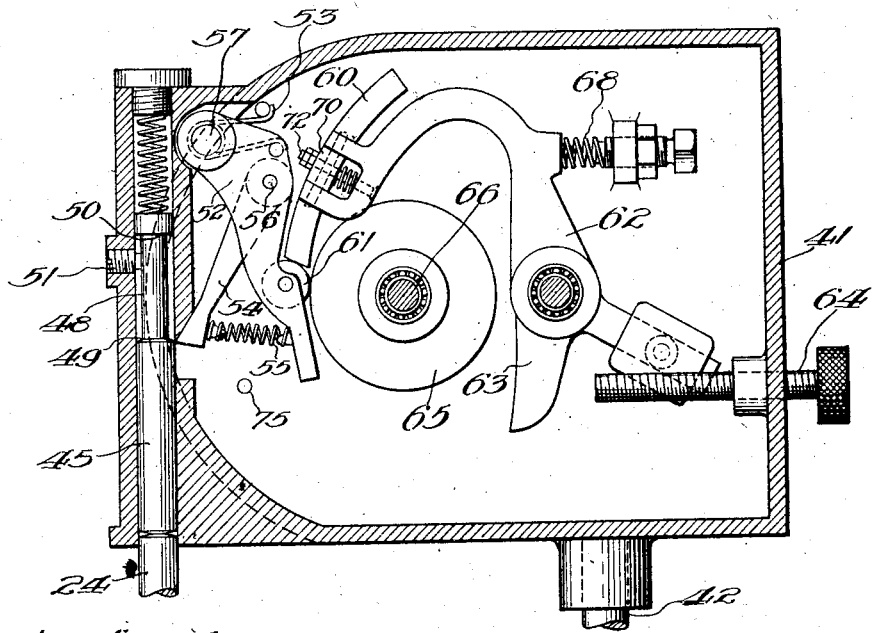

Sept. 13, 1927.
F. C. AREY
1,642,353
LENGTH CONTROL FOR SAUSAGE MACHINES
Filed Nov. 28, 1924
4 Sheets-Sheet 1
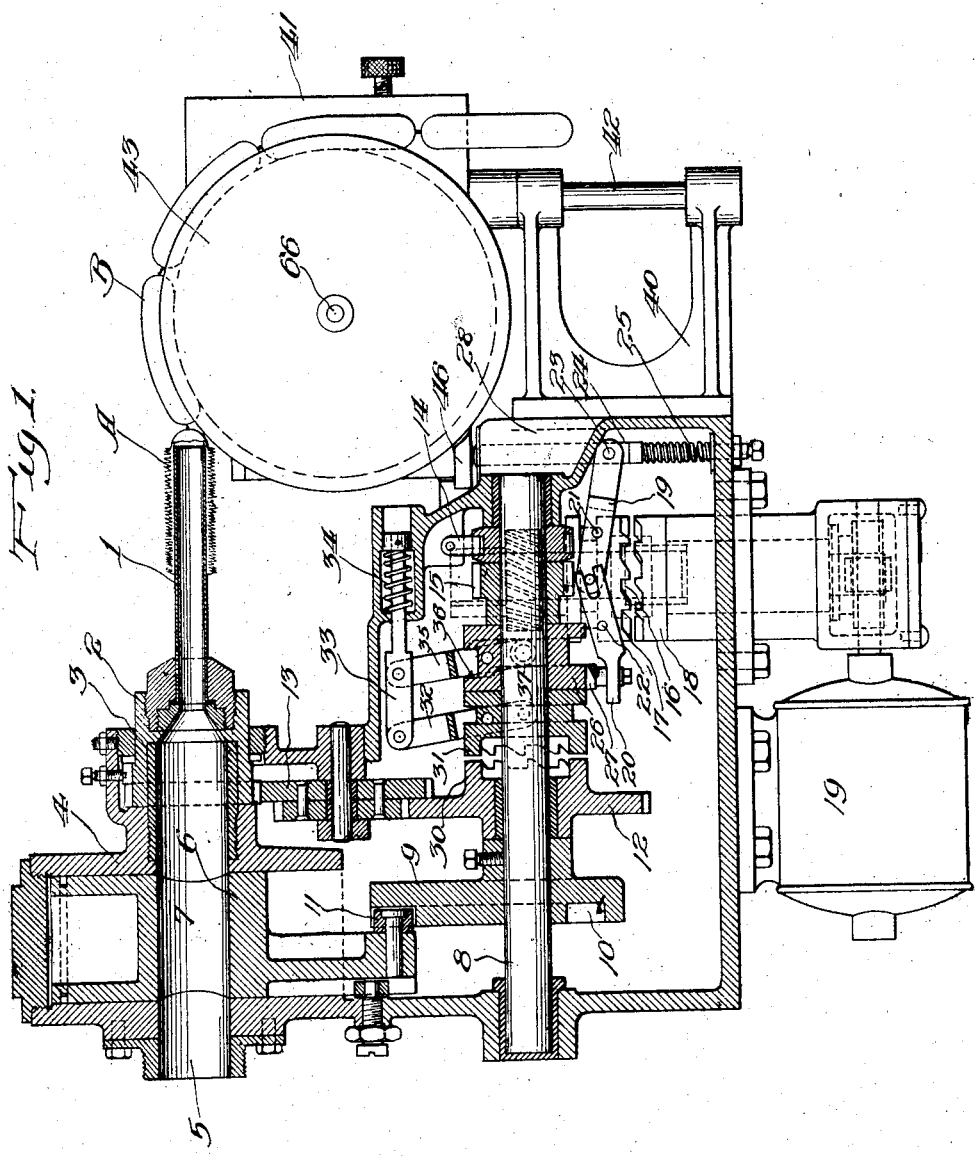
Inventor:
Fred C. Arey,
by Wm. J. Freudenreich
Atty.

Sept. 13, 1927. 1,642,353
F. C. AREY
LENGTH CONTROL FOR SAUSAGE MACHINES
Filed Nov. 28, 1924. 4 Sheets-Sheet 2
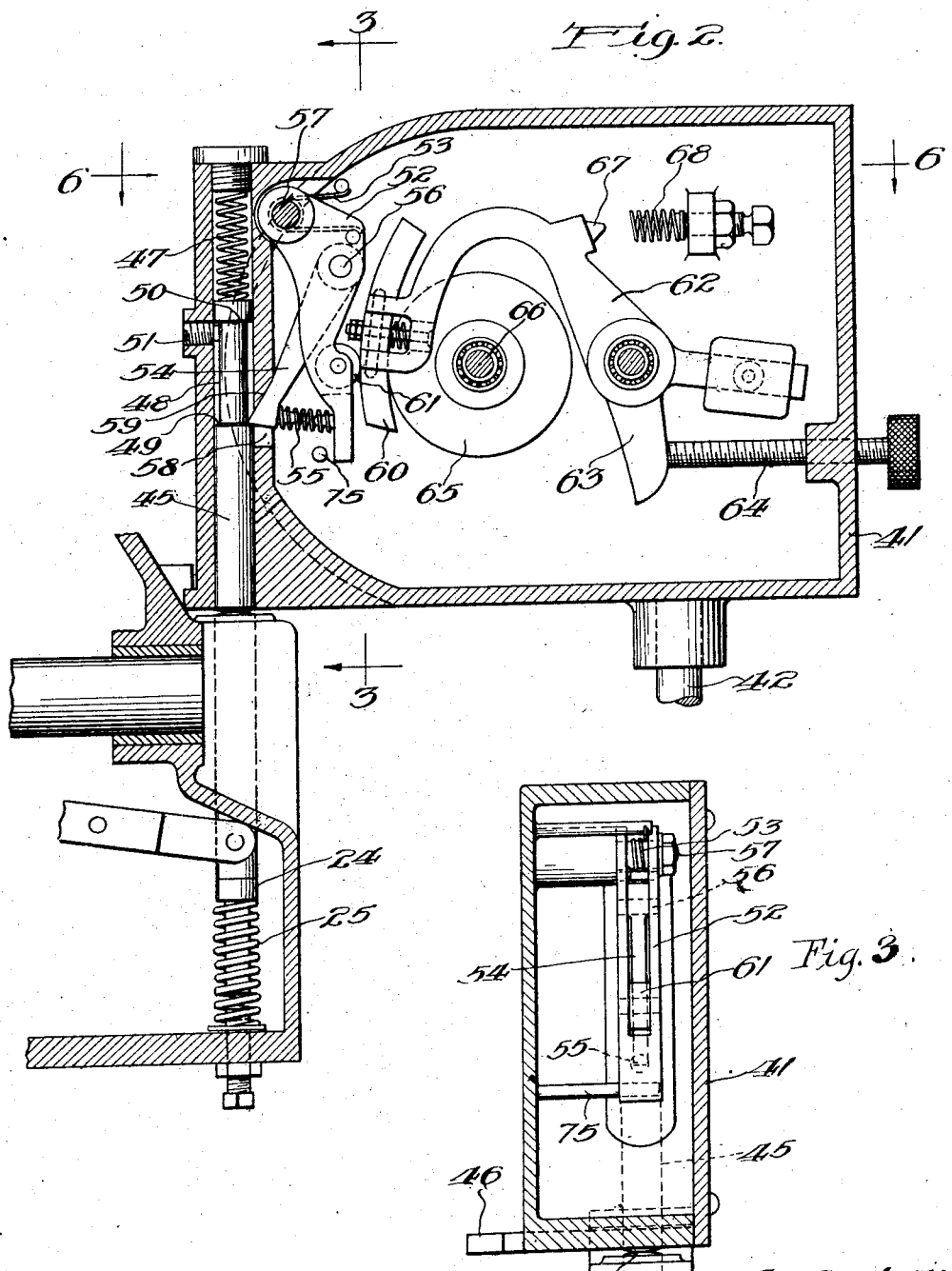

Sept. 13, 1927.  1,642,353
F. C. AREY
LENGTH CONTROL FOR SAUSAGE MACHINES
Filed Nov. 28, 1924  4 Sheets-Sheet 3

Inventor:
Fred C. Arey,
by Wm. F. Freudenreich

Sept. 13, 1927.                      1,642,353
F. C. AREY
LENGTH CONTROL FOR SAUSAGE MACHINES
Filed Nov. 28, 1924         4 Sheets-Sheet 4
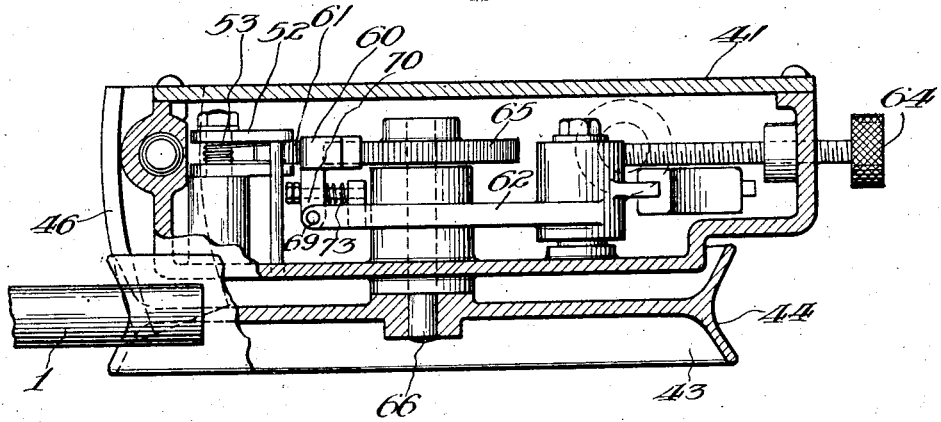
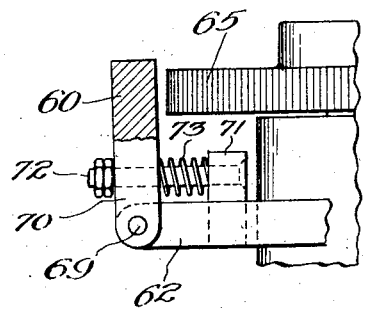
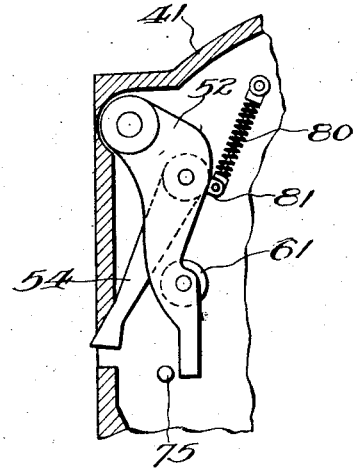
Inventor:
Fred C. Arey,
by Wm. D. Freudenreich
Atty.

Patented Sept. 13, 1927.

1,642,353

UNITED STATES PATENT OFFICE.

FRED C. AREY, OF OAK PARK, ILLINOIS, ASSIGNOR TO LEWIS J. BRAINARD, OF CHICAGO, ILLINOIS.

LENGTH CONTROL FOR SAUSAGE MACHINES.

Application filed November 28, 1924. Serial No. 752,588.

In the manufacture of sausages it is desirable that each be made of the same length as the others. The usual practice is to telescope a long sausage casing on a tube, corrugating the same so that a long piece of casing will go on a comparatively short tube. The outer end of the casing is closed by twisting or otherwise and the sausage meat is then forced through the tube against the closed end of the casing, forcing this end away from the tube and progressively filling the casing as it is stripped from the tube. The individual sausages are formed by tying the filled casing whenever a predetermined length has been filled; this tying being conveniently accomplished by rotating the tube with the empty portion of the casing thereon while the filled portion of the casing or completed sausages remain stationary. Sausage casings increase in diameter from one end to the other so that if automatic machinery is employed to produce a tie whenever a predetermined quantity of sausage meat has been ejected from the machine, the finished sausages will decrease gradually in length from the smaller end of the casing toward the larger. Various means have been suggested for automatically tying casings so as to produce sausages of uniform predetermined lengths but, so far as I know, none of these expedients have been commercially successful unless it be those having complicated electrical control apparatus.

The object of the present invention is to produce a simple and novel mechanism whereby the feeding of the sausage meat and the tying of a sausage casing will be automatically controlled by simple mechanical means set in motion by the sausages themselves, whereby sausages will be formed of uniform length regardless of the diameter of the casings.

Sausages are, of course, made in a great many different lengths and therefore the present invention may be said to have for a further object to produce a controlling mechanism that will not only insure uniformity of length, but will permit the length to be varied within wide limits by making a simple adjustment and without changing or removing any of the working parts.

In carrying out my invention I make use of a wheel that is adapted to be engaged and rotated by a filled portion of the sausage casing and set in operation mechanism to stop the feed of the sausage meat and produce a tie in the casing whenever a section of the casing of predetermined length has been filled, and then again to start the feed to produce the next sausage. While the tying should of course, be automatically done, it is conceivable that it might be done by hand and therefore, viewed in one of its aspects, my invention may be said to have for its object to produce a simple automatic control of the feeding mechanism of a sausage machine, whereby successive feeding operations will cause the delivery of individual quantities of sausage meat such as to produce sausages of uniform length regardless of the diameter of the casing.

Figure 5:
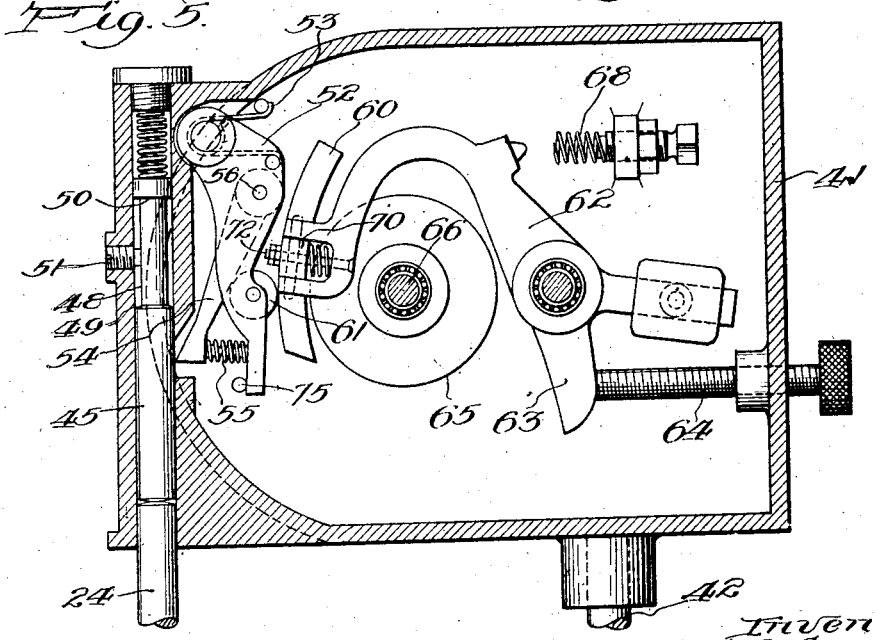

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a vertical section through a sausage making machine having applied thereto my improved measuring device which is shown in elevation; Fig. 2 is a vertical section, on the same plane as Fig. 1, through my improved measuring device, but on a larger scale than Fig. 1; Fig. 3 is a section taken approximately on line 3—3 of Fig. 2; Figs. 4 and 5 are views similar to Figs. 1 and 2, the fragment of the sausage making machine shown in Fig. 2 being omitted, showing different positions of the parts; Fig. 6 is a section taken approximately on line 6—6 of Fig. 2; Fig. 7 is a view similar to Fig. 6, showing only a fragment of the device, on an enlarged scale; and Fig. 8 is a view of a fragment of the measuring device, showing a modified form of trigger.

The present invention is not confined to any particular form of sausage making machine, but relates to a means for regulating the lengths of the individual sausages. I have therefore illustrated only so much of a sausage machine as will be sufficient for an understanding of my invention and shall only briefly describe such machine.

Referring to Fig. 1 of the drawings, 1 represents a horizontal tube upon which a long length of sausage casing A may be telescoped, the casing being corrugated transversely as it is slipped over the tube. This tube is carried by a suitable head 2 rotatably mounted on a stationary sleeve-like outlet 3 of much larger diameter than the tube. This outlet is connected to or forms part of a frame or housing 4 having a passage 5, of which the interior of the member 3 forms a part, and co-axial with the tube 1, extending through the same. A valve 6 is arranged to open and close this passage; the valve shown being a slide valve movable transversely of the passage and having an opening 7 of the same diameter as the passage extending through the same. When the valve is in the position shown in Fig. 1, the passage is open and the sausage meat may be forced through the same in any usual or suitable way and through the filling tube 1. When the valve is drawn downwardly a distance equal to the diameter of the passage, it shuts off the passage so that the feed of sausage meat ceases. It will be seen if the outer end of the casing on the filling tube is tied or held shut then, when sausage meat is forced into and through the tube, it is discharged into the casing and causes the casing to be progressively drawn off the tube as it becomes filled with meat. When a sufficient length of casing has been filled, it may be tied adjacent to the end of the tube and thus produce an individual sausage. Other sausages may then be made, one after another. The simplest way of tying the casing after the extreme outer end has once been closed, is to stop the feed of the sausage meat by closing the valve in the supply passage and then rotate the filling tube while the filled portion of the casing is held stationary.

The mechanism for controlling the feed of the sausage meat and the rotation of the tube may take any desired form. In the arrangement shown, there is a driven shaft 8 arranged in the base of the machine below and paralleling the feed passage. On this shaft is fixed a disc 9 having a cam groove 10 into which extends a roller 11 carried by a projection on the lower end of the valve. It is sufficient to say that the cam groove is so shaped that during each revolution of the shaft the valve is opened and closed, being held open and also closed during an appreciable length of time. As a matter of fact, the length of time that the valve remains open while the shaft is rotating is not important since it is only important that the valve be held closed long enough to permit the filling tube to be rotated to perform the tying operation.

There is loose on the shaft a gear wheel 12 that meshes with other gear wheels 13 of which the last element is fixed to the head 2 that carries the filling tube. This gear mechanism is so designed that during the time that the gear wheel 12 is clutched to the shaft, as will hereinafter be explained, the filling tube is turned through such angular distance as may be desired to secure the proper tie in the sausage casing; it being usually the practice to give the tube about two turns.

Normally the shaft 8, which may be termed the main shaft, is held against rotation, there being preferably provided a suitable brake 14 that will stop the shaft when the power is disconnected. The shaft is adapted to be driven by means of suitable spiral gears 15 of which one element is fixed to the main shaft and the other to an intermediate vertical shaft 16. The intermediate shaft has thereon one element 17 of a clutch that can slide vertically thereon but must rotate therewith. The other clutch element 18, which is the driving element, lies below the member 17 and is constantly driven by a suitable driving connection with a motor 19 or other suitable means. There are two operating forks for the movable clutch element, these being indicated at 19 and 20 and lying on diametrically opposite sides of this clutch element. The pivotal points of support or fulcrums for these two forks are indicated at 21 and 22 respectively. The fork 19 is employed to throw in the clutch while the other fork is employed to throw the clutch out. The outer end of the fork 19 is pivotally connected, as indicated at 23, to a vertically-slidable rod 24 mounted in the frame or housing 28 of the machine and lying below the outer end of the filling tube. A strong spring 25 tends constantly to force this rod upwardly, namely in the direction to throw in the clutch. The outer end of the other actuating fork 20 lies underneath a disc or a collar 26 fixed to the main shaft and having at one point on its periphery a projecting lug 27. When the main shaft is in such an angular position that the outer end of the fork 20 is clear of the lug, the clutch is free to be thrown in by the spring acting on the other fork, if the spring is not restrained. On the other hand, whenever the lug engages with the fork 20 it forces the outer end of the latter down so as to lift the clutch element 17 out of engagement with the cooperating clutch element, thus disconnecting the main shaft from its driving means. The main shaft and the parts carried thereby are sufficiently massive that the momentum thereof turns the shaft far enough after the clutch has been thrown out, to carry the lug clear of the actuating fork 20 and thus leave the parts in such a condition that the clutch may again be thrown in at the proper time.

As soon as the clutch is thrown in, the main shaft begins to turn and causes the valve 6 to close so as to shut off the feed of sausage meat. After the valve has been closed, the gear 12 of the train that serves to rotate the filling tube is clutched to the shaft so that the tube will be rotated while the feed of sausage meat remains interrupted. The clutch for this purpose consists of an element 30 fixed to the gear 12, and a complementary element 31 slidable on but rotatable with the main shaft. There is an actuating fork 32 for the clutch element 31, the outer end of this fork having attached thereto one end of a rod 33, which is acted on by a spring 34 in a direction tending constantly to throw the clutch member 31 into engagement with the clutch member 30. The spring 34 is restrained by a fork 35, similar to one of the clutch actuating forks, the outer end of this fork being pivotally connected to the rod 33, and the forked end embracing a collar fixed to the main shaft and having an external cam groove 36 in which play rollers 37 carried by the fork. This collar may be a part of the member 26 that carries the lug 27 for throwing the main clutch out. The cam groove 26 is so designed that the clutch for controlling the rotation of the filling tube remains out for some time after the main shaft has begun to rotate, thus giving the shut off valve 6 time to be closed. After the shut off valve has been closed, the cam rollers associated with the fork 35 enter a part of the cam groove 36 so disposed that the spring 34 is left free to operate the fork 32 in a direction to engage the clutch member 31 with the clutch member 30. The engagement of these two clutch members continues just long enough to permit the filling tube to be turned through the desired angular distance, whereupon the fork 35 is swung in the direction to disengage the clutch member 31 from the clutch member 30; this engagement being effected shortly before the lug 27 operates to throw out the main clutch.

The present invention has to do with the throwing in of the main clutch at the proper time, depending on the length of the individual sausages to be made, the throwing out of the main clutch being automatically effected during each cycle, so that the length of an individual sausage depends simply on the length of time that the main clutch remains out.

As shown in Fig. 1, the housing of the mechanism just described has a bracket 40 extending from the end thereof at which the controlling rod 24 for the main clutch is located. Arranged above this bracket and supported thereon so as to be rotatable about a vertical axis at the outer end of the latter is a housing 41; this housing being shown as being fixed to the upper end of a shaft 42 rotatably mounted in vertically spaced bearings in the brackets. On one side of the housing is arranged a large vertical wheel 43 having a grooved periphery 44 as best shown in Fig. 6. This wheel, when the parts are in the position shown in Fig. 1, lies just in front of the outer end of the filling tube, the top of the wheel being slightly higher than the tube. Thus, when the closed end of a sausage casing is filled and the casing is progressively pushed outwardly, as the filling of the same proceeds, the filled portion of the casing rests in the groove in the rim of the wheel 43 and, the later being delicately balanced, rotates the wheel. The reason for mounting the housing 41 so that it may be swung laterally is to permit the wheel 43 to be moved from in front of the filling tube whenever it is desired to place a new casing on the latter. The controlling rod 24 for the main clutch is in turn controlled by mechanism governed by the wheel 43. Therefore the rod 24 cannot continue upwardly as one piece far enough to interfere with the swinging movements of the housing on which the governing wheel is supported and, as best shown in Fig. 2, this rod terminates in the plane of the bottom of the housing 41 and is there engaged with the lower end of a second rod 45 mounted to have vertical sliding movements in a part of the housing. The housing is provided with a segmental foot or flange 46 that overlies and engages with the top of the rod 24 when the housing 41 is swung laterally, to prevent the actuating spring for the rod from pushing the rod upwardly. Above the upper end of the rod 45 is a light spring 47 that assists gravity in pushing this rod down. A section of considerable length near the upper end of the rod 45 is reduced in diameter, as indicated at 48, forming a lower upwardly-directed shoulder 49 and an upper downwardly facing shoulder 50. A set screw 51 extends through the wall of the housing 41 into the space between the shoulders 49 and 50, thus limiting the lengthwise movements of the rod 45.

Unless restrained by other mechanism than that yet described, the spring 25 will push the rods 24 and 45 upwardly against the resistance of the spring 47 and throw the main clutch in. However, means including preferably trigger mechanism are provided for positively holding the rod 45 against upward movement during intervals of such length to permit the feeding of quantities of sausage meat in sufficient amounts to produce sausages of the desired lengths. In the arrangement shown, there is a trigger mechanism consisting of an arm 52 pivotally supported at its upper end adjacent to the rod 45, so as to permit its lower end to swing from and toward the rod; there being a spring 53 that tends constantly to carry the lower end of this arm toward the rod. On the arm is pivoted a pawl 54. A spring 55 between the lower end of the pawl and the lower end of the arm tends to spring the pawl toward the rod 45, regardless of the position of the arm. The pivotal point 56 of the pawl is arranged somewhat below the pivotal point 57 of the arm, but somewhat farther from the rod than the latter. The rod 45 lies in a tubular portion of the housing 41 and, in the wall of this tubular portion, opposite the lower end of the pawl, is cut a hole 58. The parts are so proportioned that when the rod 45 is in its lower position, the pawl extends through the opening 58 and rests on the shoulder 49. On account of the peculiar construction, the pawl itself does not serve as a positive lock for the rod, but the spring 25, being much more powerful than the combined springs 47 and 53, will force the rods 24 and 45 upwardly, pushing the pawl upwardly and swinging the arm 52 in the counter clockwise direction as viewed in Fig. 2. The upper edge of the hole 58 is bounded by a surface 59 arranged in acute angle to the vertical, namely at the same angle as the adjacent face of the pawl when the latter is in its locking position as indicated in Fig. 1. Therefore, when the pawl is pushed upwardly by the rod 45, it is forced to follow the inclined face 59 so as to be drawn laterally clear of the shoulder 49.

Means are provided for positively holding the trigger mechanism against being swung out of the locking position indicated in Fig. 2. The immediate holding means is a bar 60 that is adapted to be moved into and out of a position in which it engages with the lower end of the arm and prevents this arm from swinging outwardly from the rod 45. To reduce friction, the arm 52 is provided with a roller 61 through which contact with the bar 60 is effected. This bar may take any of various shapes and be supported in any one suitable way. In the arrangement shown, it is segmental in form and is shown as mounted on the end of a pivoted arm 62 suitably counterweighted. The arm 62 has a nose 63 adapted to engage an adjustable stop which may conveniently be a long set screw as shown at 64; this set screw extending through a wall of the housing 41 so that it may be adjusted from a point outside of the housing. The parts are so proportioned that the arm tends normally to drop into the position shown in Fig. 2, the limit to which the lower end of the bar 60 descends depending on the adjustment of the screw 64. Means actuated by the wheel on which the sausages rest is provided for swinging the arm 62 up and thus raising the bar 60, in order to release the trigger and permit it to be thrown out of locking position by the upward pressure on the rod 45. In the arrangement shown, this means consists of an auxiliary wheel 65 arranged within the housing 41 and fixed to one end of a shaft 66 to the other end of which the wheel 43 is attached. Therefore the wheels 43 and 65 turn in unison with each other, as best shown in Fig. 6. The periphery of the auxiliary wheel 65 is preferably provided with fine transverse serrations, as is also the side or face of the bar 60 directed toward this wheel. The parts are so proportioned that the bar lies directly opposite the perpihery of the auxiliary wheel and, when it is brought down into the space between the auxiliary wheel and the roller 61 on the trigger, and the trigger is brought into the position shown in Fig. 2, the roller presses against the bar and the bar presses against the auxiliary wheel; thereby positively locking the trigger against a movement in the direction to release the rod 45. Then, when the auxiliary wheel is rotated, as sausage meat is flowing into a casing to produce a sausage, the engaged serrated surfaces of the auxiliary wheel and the bar, cause the bar to be raised until the lower end comes above the horizontal diameter of the roller on the trigger. When this condition is reached, there remains nothing to prevent the trigger from being retracted and the powerful clutch-operating spring 25 forces the rod 45 upwardly and throws the trigger into its release position. As the arm that carried the bar swings upwardly, a projection 67 at a considerable distance from the pivotal axis of the arm, abuts against a compression spring 68; this occurring just as the bar reaches the position which permits the trigger to be released. The quick movement of the roller 61 toward the periphery of the auxiliary wheel, during the releasing movement of the trigger, results in snapping the bar upwardly, much in the same way that a pea or other small object may be shot across space by squeezing one-half thereof between the ends of one's thumb and forefinger. This snapping action causes the spring 68 to be compressed and thereafter exert a thrust on the swinging arm or lever 62 in a direction to throw the bar down into its holding position.

The bar 60 is not rigid with the lever or arm 62, but is hinged thereto, as indicated at 69 in Fig. 7, by means of an ear or lug 70 projecting laterally therefrom. The member 62 has lug 71 lying opposite the lug or ear 70. A bolt 72 extends through the lug 71 and loosely through the lug 70. A compression spring 73 surrounds the bolt between the two lugs. The parts are so proportioned that, when free to do so, the spring 73 holds the bar 60 out of engagement with the periphery. However, when pressure is exerted on this bar by the roller on the trigger, the bar is forced against the periphery of the auxiliary wheel.

In Fig. 4 the parts are shown in the positions which they occupy at the instant that the trigger has been brought ito a full release position. It will be seen that the bar 60 has been shot up far enough so that it now rests on the top of the roller 61. As soon as the condition illustrated in Fig. 4 is reached, the rod 45 is forced up, the main clutch of the machine being thrown in and the main shaft being caused to rotate. As soon as the rod 45 rises, the parts assume the positions shown in Fig. 5. It will be seen that as soon as the influence of the main clutch spring 25 on the trigger ceases, the parts of which the trigger is formed are controlled directly by the two springs, 53 and 55 associated with the trigger. The result is that the spring 53 tends to swing the entire trigger in the clockwise direction. However, the lower end of the pawl is resting against the side of the rod 45 and therefore cannot, move laterally any farther at this time. The spring 53 is more powerful than the spring 55 and therefore the member or arm 52 of the pawl is swung in the clockwise direction, either until the spring 55 is compressed or until it is arrested in some other manner. I have provided a stop in the form of a stationary pin 75 against which the lower end of the member 52 of the trigger strikes before the spring 55 is completely compressed, but allowing the trigger so to adjust itself that a space is left between the roller 61 and the auxiliary wheel 65 considerably wider than the thickness of the bar 60. Therefore the bar 60 is permitted to drop from the position shown in Fig. 4 to that shown in Fig. 5 without being in contact with the auxiliary wheel or even with the roller after it once drops down beside the latter.

From the description of the operation of the saugage meat delivering mechanism, it will be understood that when the main clutch is in, the first step is to close the shut off valve 6, arresting the feed of the saugage meat and therefore bringing the measuring or regulating wheel 43 to rest, with the finished saugages lying in the groove in the rim. After the feed has been interrupted, the filling tube is quickly rotated, producing a twist in the casing just beyond the end of the filling tube. This twisting of the casing is made possible by the fact that the completed sausages are held against rotation by their inertia and the friction between them and the supporting wheel. During these operations the trigger mechanism is in the position shown in Fig. 5. After the twist or tie has been made in the casing, the main clutch is thrown out, as heretofore explained, forcing the rod 24 down and compressing the spring 25. The rod 45 follows the rod 24 down by the action of gravity and the pressure of the spring 47 above the same; this downward movement being continued somewhat below the point shown in Fig. 2, in order that the spring 55 in the trigger may force the pawl 54 against the reduced portion of the rod 45 slightly above the shoulder 49. Then, when the lug 27 moves clear of the outer end of the clutch actuating fork 20, the main spring 25 thrusts the rod 24, and with it the rod 45, in the upward direction, until the shoulder 49 engages with the nose on the pawl 54. The pawl is therefore subjected to the upward thrust of the spring 25 and causes the member 52 of the trigger to swing in the counter clockwise direction until the roller 61 engages with the bar 60 and presses the bar against the auxiliary wheel, after which further displacement of the parts of the trigger is prevented. Just before the main clutch is thrown out, the shut off valve is again opened, so that by the time the measuring mechanism, including the trigger, has been reset, that is brought from the condition shown in Fig. 5 to that shown in Fig. 2, the sausage meat again begins to flow into the casing. As the casing becomes filled, the filled portion moves outwardly from the end of the filling tube, pushing the finished sausages ahead of it, and thus rotating the wheel 43. As this wheel rotates, it drives the holding bar 60 up until it becomes clear of the roller 61, as heretofore explained. Thereupon the feed is again stopped and the casing twisted. It will be seen that each step through which the wheel 43 turns corresponds to the length of an individual sausage. Furthermore, the distance through which this wheel may turn during each cycle of operations, depends upon the length of that portion of the bar that lies below the horizontal diameter of the roller 61 at the time the wheel starts to turn. Therefore, by adjusting the set screw 64, so as to make a longer or a shorter portion of the bar lie below the horizontal diameter of the roller at the beginning of a turning movement, the angle through which the measuring wheel will rotate during each cycle of operations may be varied at will. The set screw 64 having once been adjusted, however, the wheel will thereafter turn through precisely the same angle during each cycle, so that all the sausages that are made while this adjustment lasts will be measured to have uniform lengths.

Instead of employing two springs in the trigger mechanism, a single spring may be utilized. Thus in the arrangement shown in Fig. 8 the springs 53 and 55 are omitted, and there is employed a single spring 80 placed between a stationary part and a lug 81 on the pawl 54; the parts being so proportioned that the spring tends not only to turn the pawl about its pivot, but also to swing the pawl and the supporting arm 52 about the pivotal axis of the arm 52.

It will thus be seen that I have produced a simple mechanism for accurately graduating a sausage casing, as it is filled, to produce sausages of uniform length, and that the length may be varied by any desired increment throughout a comparatively wide range by the simple act of turning a regulating screw. Thus the entire mechanism is purely mechanical and, although it may be made extremely sensitive, is rugged and durable, so that no care need be exercised to keep it in proper working order. Also, there are no parts that need be removed or replaced in order to vary the length of the sausages.

While I have illustrated and described with particularity only a single preferred form of my invention, together with a slight modification, I do not desire to be limited to the exact structural details thus illustrated and described; but intend to cover all forms and arrangements which come within the definitions of my invention constituting the appended claims.

I claim:

1. In combination, a rotatable tube for stuffing sausage meat into a casing telescoped thereon, a wheel mounted adjacent to said tube in position to be engaged at its periphery and turned by a filled portion of the casing during the time sausage meat is entering the casing, mechanism for stopping the feed of the meat and causing the tube to rotate, and mechanical means mechanically controlled by the rotating movement of said wheel for controlling said mechanism.

2. The combination with a machine having a rotatable tube for stuffing sausage meat into a casing telescoped thereon and mechanism for alternately stopping and starting the feed of the meat and rotating the tube through a predetermined angular distance during a cessation of the feed, of a wheel adapted to be moved by a filled portion of the casing, and means including a part adapted to be alternately engaged with the wheel to be driven thereby and released therefrom for controlling said mechanism.

3. The combination with a machine adapted to stuff sausage meat into a casing and having mechanism for alternately starting and stopping the feed of the meat and tying the casing to produce an individual sausage during a cessation of the feed, of a wheel arranged to be moved by a filled portion of the casing during the time sausage meat is entering the casing, controlling means for said mechanism, and a mechanical tripping device associated with said wheel for governing said controlling means.

4. The combination with a machine adapted to stuff sausage meat into a casing and having mechanism for alternately starting and stopping the feed, of a wheel arranged to be rotated by a filled portion of the casing, while the sausage meat is entering the casing, and means controlled by the rotation of said wheel for governing said mechanism.

5. The combination with a machine adapted to stuff sausage meat into a casing and having mechanism for alternately starting and stopping the feed, of a wheel arranged to be rotated by a filled portion of the casing while the sausage meat is entering the casing, a trigger for locking said mechanism in an idle condition, and a tripping device for said trigger associated with said wheel.

6. The combination with a machine adapted to stuff sausage meat into a casing and having mechanism for alternately starting and stopping the feed, of a wheel arranged to be rotated by a filled portion of the casing while the sausage meat is entering the casing, a trigger for locking said mechanism in an idle condition, an auxiliary wheel attached to the aforesaid wheel and having its periphery arranged in the vicinity of said trigger, a locking bar movably supported in position between the periphery of the auxiliary wheel and the trigger to hold the trigger in its working position and to be moved by said auxiliary wheel into a position which leaves the trigger free to release.

7. The combination with a machine adapted to stuff sausage meat into a casing and having mechanism for alternately starting and stopping the feed, of a wheel arranged to be rotated by a filled portion of the casing while the sausage meat is entering the casing, a trigger constructed and arranged to lock said mechanism in an idle condition when restrained in its working position and to be left free to be moved into a release position by said mechanism when unrestrained, an auxiliary wheel on the aforesaid wheel having its periphery in the vicinity of said trigger, a trigger-restraining bar mounted so as to be movable into and out of the space between the trigger and the periphery of the auxiliary wheel and act as an element to hold the trigger in its working position when the bar lies in said space, said auxiliary wheel and said bar having co-acting faces whereby the bar is moved out of said space into an idle position by said wheel, the supporting means for said bar being constructed and arranged to hold the face on the bar out of contact with the auxiliary wheel except during the time when the trigger presses the bar against the auxiliary wheel, and said trigger being constructed and arranged to press said bar against the auxiliary wheel when the trigger is in its locking position.

8. The combination with mechanism for stuffing sausage meat into a casing including a clutch for starting and stopping said mechanism, of a spring tending constantly to throw said clutch in, a spring-pressed trigger opposing the spring for locking said clutch out, the parts being so proportioned and arranged that the clutch spring forces the trigger into a release position when the trigger is not restrained otherwise than by its spring, a wheel member adapted to be rotated by a filled portion of the casing during the feeding of sausage meat into the casing, and means associated with said wheel for holding the trigger in its locking position during a predetermined portion of a rotation of the wheel and then leaving the trigger free to be tripped by the clutch spring.

9. The combination with mechanism for stuffing sausage meat into a casing including a clutch for starting and stopping said mechanism, of a spring tending constantly to throw said clutch in, a spring-pressed trigger opposing the spring for locking said clutch out, the parts being so proportioned and arranged that the clutch spring forces the trigger into a release position when the trigger is not restrained otherwise than by its spring, a wheel member adapted to be rotated by a filled portion of the casing during the feeding of sausage meat into the casing, a bar movably mounted so as to be movable between a position in which it engages with both the trigger and the periphery of the wheel to hold the trigger in its locking position and a position in which it leaves the trigger free to trip, and there being cooperating faces on the wheel and the bar to cause the wheel to move the bar from the first to the second position as the wheel rotates.

10. The combination with mechanism adapted to stuff sausage meat into a casing and a clutch for controlling said mechanism, of a spring tending constantly to throw said clutch in, a rod movable in the direction of its length with the clutch and having a transverse shoulder, a spring-pressed trigger adapted to engage with said shoulder to lock the clutch out, the parts being so proportioned that the clutch spring causes the trigger to move into its release position when the trigger is not otherwise restrained than by its spring, a wheel located with its periphery directed toward said trigger, the wheel being adapted to be rotated by a filled portion of the casing while sausage meat is entering the casing, the parts being also so proportioned and arranged that the trigger is more remote from the wheel in its release position than when it is in its locking position, a bar movable in the direction of its length and tending constantly to move into the space between the periphery of the wheel and the trigger and serving as a stop for the trigger when the latter is in its locking position, the bar being also movable in a direction radially of the wheel so as to be pressed against the wheel by the trigger, and the bar and the wheel having cooperating faces for causing the wheel to move said bar out of said space and permit the trigger to trip when the wheel is rotated through a predetermined angle.

11. The combination with mechanism for stuffing sausage meat into a casing including a clutch for starting and stopping said mechanism, of a spring tending constantly to throw said clutch in, a spring-pressed trigger opposing the spring for locking said clutch out, the parts being so proportioned and arranged that the clutch spring forces the trigger into a release position when the trigger is not restrained otherwise than by its spring, a wheel member adapted to be rotated by a filled portion of the casing during the feeding of sausage meat into the casing, a bar movably mounted so as to be movable between a position in which it engages with both the trigger and the periphery of the wheel to hold the trigger in its locking position and a position in which it leaves the trigger free to trip, and there being cooperating faces on the wheel and the bar to cause the wheel to move the bar from the first to the second position as the wheel rotates, and means for varying the extent of travel of the bar after entering said space to thereby vary the angle through which the wheel must turn to cause the trigger to trip.

12. The combination with mechanism adapted to stuff sausage meat into a casing and a clutch for controlling said mechanism, of a spring tending constantly to throw said clutch in, a rod movable in the direction of its length with the clutch and having a transverse shoulder, a spring-pressed trigger adapted to engage with said shoulder to lock the clutch out, the parts being so proportioned that the clutch spring causes the trigger to move into its release position when the trigger is not otherwise restrained than by its spring, a wheel located with its periphery directed toward said trigger, the wheel being adapted to be rotated by a filled portion of the casing while sausage meat is entering the casing, the parts being also so proportioned and arranged that the trigger is more remote from the wheel in its release position than when it is in its locking position, a bar movable in the direction of its length and tending constantly to move into the space between the periphery of the wheel and the trigger and serving as a stop for the trigger when the latter is in its locking position, the bar being also movable in a direction radially of the wheel so as to be pressed against the wheel by the trigger, and an adjustable stop for varying the extent of movement of said bar after it enters said space and thus varying the angle through which the wheel must turn to release the trigger.

13. The combination with a machine adapted to stuff sausage meat into a casing and having mechanism for alternately starting and stopping the feed, of a wheel arranged to be rotated by a filled portion of the casing while the sausage meat is entering the casing, and means including a stop actuated by the rotation of said wheel for controlling said mechanism and causing the feed to be interrupted whenever the wheel has turned through a predetermined angle.

14. The combination with a machine adapted to stuff sausage meat into a casing and having mechanism for alternately starting and stopping the feed, of a wheel arranged to be rotated by a filled portion of the casing while the sausage meat is entering the casing, means controlled by said wheel for causing the feed to be interrupted whenever the wheel has turned through a predetermined angle, and means for varying the angle through which the wheel may turn before the feed is stopped.

15. The combination with a machine adapted to stuff sausage meat into a casing and having mechanism for alternately starting and stopping the feed, of a wheel arranged to be rotated by a filled portion of the casing while the sausage meat is entering the casing, a trigger for locking said mechanism in an idle condition, and means associated with said wheel for causing said trigger to trip whenever the wheel has turned through a predetermined angle after the feeding of sausage meat has begun.

16. The combination with a machine adapted to stuff sausage meat into a casing and having mechanism for alternately starting and stopping the feed, of a wheel arranged to be rotated by a filled portion of the casing while the sausage meat is entering the casing, a trigger for locking said mechanism in an idle condition, means associated with said wheel for causing the trigger to trip whenever the wheel has been moved as aforesaid through a predetermined angle, and means for varying said angle.

17. In a machine of the character described, a spring-actuated device, a rotatable controlling wheel, a trigger arranged between said wheel and said device for restraining the latter, the parts being so proportioned and arranged that the spring for said device moves said trigger into its release position unless the trigger is otherwise restrained and the trigger in its release position is yieldingly held farther away from the wheel than when in its locking position, a bar movably mounted so as to move between a position in which it lies in the space between the trigger and the wheel and a position beyond said space, said bar being yieldingly supported so that it is out of contact with both the trigger and the wheel when it lies in said space is pressed against said wheel by the trigger when the latter is in its locking position.

18. The combination with mechanism for stuffing sausage meat into a casing including a clutch for starting and stopping said mechanism, of a spring tending constantly to throw said clutch in, a spring-pressed trigger opposing the spring for locking said clutch out, the parts being so proportioned and arranged that the clutch spring forces the trigger into a release position when the trigger is not restrained otherwise than by its spring, a wheel member adapted to be rotated by a filled portion of the casing during the feeding of sausage meat into the casing, the parts being also so proportioned and arranged that the trigger is more remote from the wheel in its release position than in its locking position, an arm mounted to swing about an axis parallel with the axis of rotation of the wheel, a curved bar carried by said arm and tending constantly to drop into the space between the wheel and the trigger, the connection between the bar and the arm being a yieldable one adapted to keep the bar out of contact with the trigger and also with the wheel when it drops into said space while the trigger is in its release position and permit the trigger to press the bar against the wheel and be driven thereby when the trigger is in its locking position.

19. The combination of a sausage filling machine having a tube for receiving a sausage casing, of controlling means including a wheel adapted to be engaged by a filled portion of a casing and be rotated thereby, and a movable support for said controlling means permitting the wheel to be moved from a position in front of the tube into an idle position in which it leaves the space in front of the tube unobstructed.

In testimony whereof, I sign this specification.

FRED C. AREY.